US012424756B2

(12) United States Patent
Jin et al.

(10) Patent No.: US 12,424,756 B2
(45) Date of Patent: Sep. 23, 2025

(54) ANTENNA AND ELECTRONIC DEVICE

(71) Applicants: Beijing BOE Sensor Technology Co., Ltd., Beijing (CN); BOE TECHNOLOGY GROUP CO., LTD., Beijing (CN)

(72) Inventors: Yunnan Jin, Beijing (CN); Chunnan Feng, Beijing (CN); Zhifeng Zhang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/027,700

(22) PCT Filed: Mar. 28, 2022

(86) PCT No.: PCT/CN2022/083381

§ 371 (c)(1),
(2) Date: Mar. 22, 2023

(87) PCT Pub. No.: WO2023/184087

PCT Pub. Date: Oct. 5, 2023

(65) Prior Publication Data

US 2024/0297440 A1 Sep. 5, 2024

(51) Int. Cl.
*H01Q 9/04* (2006.01)
*H01Q 1/36* (2006.01)
*H01Q 21/08* (2006.01)

(52) U.S. Cl.
CPC ............. *H01Q 9/0485* (2013.01); *H01Q 1/36* (2013.01); *H01Q 21/08* (2013.01)

(58) Field of Classification Search
CPC ........ H01Q 9/0485; H01Q 1/36; H01Q 21/08; H01Q 1/38; H01Q 1/50; H01Q 21/065;
(Continued)

(56) References Cited

U.S. PATENT DOCUMENTS

2004/0150561 A1* 8/2004 Tillery .................. H01Q 21/08 343/846
2005/0054317 A1 3/2005 Ro et al.
(Continued)

FOREIGN PATENT DOCUMENTS

CN 207303349 U 5/2018
CN 113193385 A 7/2021
(Continued)

OTHER PUBLICATIONS

Octagonal Microstrip Patch Antenna for Dual Band Applications—Binu Paul (Year: 2005).*

*Primary Examiner* — Dimary S Lopez Cruz
*Assistant Examiner* — Anna N Hamadyk
(74) *Attorney, Agent, or Firm* — HOUTTEMAN LAW LLC

(57) ABSTRACT

An antenna and an electronic device are provided, and belong to the field of communication technology. The antenna includes a first substrate and a second substrate opposite to each other. The first substrate includes a first dielectric substrate; a first radiation layer is on the first dielectric substrate and includes at least one first radiation portion and at least one feed structure. The first radiation portion is at least electrically connected to one feed structure; and a first reference electrode layer is on a side of the first dielectric substrate away from the first radiation layer. The second substrate includes a second dielectric substrate on a side of the first radiation layer away from the first dielectric substrate with a first distance therebetween; a second radiation layer is on the second dielectric substrate and includes at least one second radiation portion.

18 Claims, 12 Drawing Sheets

(58) Field of Classification Search
CPC ........ H01Q 9/045; H01Q 9/0407; H01Q 5/45; H01Q 9/0414; H01Q 9/0435
See application file for complete search history.

(56) References Cited

U.S. PATENT DOCUMENTS

| | | | | |
|---|---|---|---|---|
| 2011/0074637 | A1* | 3/2011 | Sotoma | H01Q 9/42 343/700 MS |
| 2021/0143558 | A1* | 5/2021 | LeBlanc | H01Q 5/307 |

FOREIGN PATENT DOCUMENTS

| | | | |
|---|---|---|---|
| CN | 213845498 | U | 7/2021 |
| JP | H1131914 | A | 2/1999 |
| WO | 2022246814 | A1 | 12/2022 |

* cited by examiner

ANTENNA AND ELECTRONIC DEVICE

TECHNICAL FIELD

The present disclosure relates to the field of communication technology, and in particular to an antenna and an electronic device.

BACKGROUND

With the increasing number of 5G base stations, the beautification of the environment is undoubtedly influenced to a great extent by the over-dense layout of the 5G base stations. Therefore, a base station antenna with transparent beautification characteristics becomes a new scheme. Meanwhile, miniaturization is one of the key requirements for the design of the antenna. Therefore, nowadays, how to achieve an antenna with both transparency and a low profile for the 5G base station becomes a major trend and a subject.

SUMMARY

The present disclosure is directed to at least one of the technical problems of the prior art, and provides an antenna and an electronic device.

In a first aspect, an embodiment of the present disclosure provides an antenna, including a first substrate and a second substrate opposite to each other; wherein the first substrate includes: a first dielectric substrate; a first radiation layer on the first dielectric substrate and including at least one first radiation portion and at least one feed structure; wherein each of the at least one first radiation portion is at least electrically connected to one of the at least one feed structure; and a first reference electrode layer on a side of the first dielectric substrate away from the first radiation layer; and the second substrate includes: a second dielectric substrate on a side of the first radiation layer away from the first dielectric substrate, wherein the second dielectric substrate and the first radiation layer have a first distance therebetween; and a second radiation layer on the second dielectric substrate and including at least one second radiation portion; wherein an orthographic projection of each second radiation portion on the first dielectric substrate at least partially overlaps with an orthographic projection of the corresponding first radiation portion on the first dielectric substrate; and orthographic projections of the at least one first radiation portion, the at least one feed structure and the at least one second radiation portion on the first dielectric substrate all at least partially overlap with an orthographic projection of the first reference electrode layer on the first dielectric substrate.

In some embodiments, the at least one feed structure includes a first feed structure and a second feed structure; the first and second feed structures each include one first feed port and at least one second feed port; each second feed port of the first feed structure is connected to a corresponding first radiation portion at a first node; each second feed port of the second feed structure is connected to a corresponding first radiation portion at a second node; and for each first radiation portion, there is an angle between an extending direction of a connecting line between the first node on the first radiation portion and a center of the first radiation portion and an extending direction of a connecting line between the second node on the first radiation portion and the center of the first radiation portion.

In some embodiments, the antenna includes a plurality of sub-arrays, each of which includes one or more first radiation portions and one or more second radiation portions, and the one or more first radiation portions in each sub-array are fed by one first feed structure and one second feed structure, and the first radiation portions in different sub-arrays are fed by different first feed structures and different second feed structures In some embodiments, each feed structure includes a plurality of branch lines from the first feed port to the at least one second feed port; at least a part of the plurality of branch lines have different line lengths; and an impedance difference between any two branch lines of each sub-array is in a range from 0.9Ω to 1.1Ω.

In some embodiments, for each first radiation portion, the extending direction of the connecting line between the first node on the first radiation portion and the center of the first radiation portion is perpendicular to the extending direction of the connecting line between the second node on the first radiation portion and the center of the first radiation portion.

In some embodiments, each first radiation portion includes a polygon, and any interior angle of the polygon is greater than 90°.

In some embodiments, the polygon includes a first side, a second side, a third side, a fourth side, a fifth side, a sixth side, a seventh side, and an eighth side which are connected sequentially; an extending direction of the first side is the same as that of the fifth side, and is perpendicular to that of the third side; one corresponding second feed port of the first feed structure and one corresponding second feed port of the second feed structure are connected on the second and fourth sides, respectively.

In some embodiments, a ratio of a line connecting a midpoint of the second side and a midpoint of the sixth side of each first radiation portion to a diagonal line of the corresponding second radiation portion is in a range from 1.05:1 to 1.25:1.

In some embodiments, the first dielectric substrate includes a first bottom plate, a first side plate and a second side plate, the first bottom plate includes a first side surface and a second side surface extending in a first direction and opposite to each other in a second direction, the first side plate is connected to the first side surface, and the second side plate is connected to the second side surface; extending planes of the first side plate and the second side plate intersect with an extending plane of the first bottom plate; the first reference electrode layer matches with the first dielectric substrate, and includes a first reference sub-electrode opposite to the first bottom plate, a second reference sub-electrode opposite to the first side plate, and a third reference sub-electrode opposite to the second side plate; a third dielectric substrate is on a side of the second reference sub-electrode away from the first side plate, and a fourth dielectric substrate is on a side of the third reference sub-electrode away from the second side plate; and at least one first transmission line is on a side of the third dielectric substrate away from the second reference sub-electrode, and at least one second transmission line is on a side of the fourth dielectric substrate away from the third reference sub-electrode; one end of each first transmission line is electrically connected to the first feed port of the corresponding first feed structure through a first via extending through the first side plate, the second reference sub-electrode and the third dielectric substrate; and one end of each second transmission line is electrically connected to the first feed port of the corresponding second feed structure through a second via extending through the second side plate, the third reference sub-electrode and the fourth dielectric substrate.

In some embodiments, a second reference electrode layer is on a side of the third dielectric substrate close to the second reference sub-electrode, and a third reference electrode layer is on a side of the fourth dielectric substrate close to the third reference sub-electrode.

In some embodiments, the first radiation layer further includes a first base material, the at least one first radiation portion is on the first base material, and the first base material is attached to the first dielectric substrate by a first adhesive layer.

In some embodiments, the second radiation layer further includes a second base material, the at least one second radiation portion is on the second base material, and the second base material is attached to the second dielectric substrate by a second adhesive layer.

In some embodiments, at least one of the at least one first radiation portion, the at least one second radiation portion, the reference electrode layer includes a metal mesh structure.

In some embodiments, the at least one first radiation portion, the at least one second radiation portion, and the first reference electrode layer each include the metal mesh structure, and orthographic projections of hollowed out portions of the metal mesh structure of each of the at least one first radiation portion, the at least one second radiation portion, and the first reference electrode layer on the first dielectric layer at least partially overlap with each other.

In some embodiments, each metal mesh structure has a line width in a range of 2 μm to 30 μm; a line spacing in a range of 50 μm to 200 μm; a line thickness in a range of 1 μm to 10 μm.

In a second aspect, an embodiment of the present disclosure provides an electronic device, which includes the antenna in any one of the above embodiments.

DETAIL DESCRIPTION OF EMBODIMENTS

In order to enable one of ordinary skill in the art to better understand the technical solutions of the embodiments of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
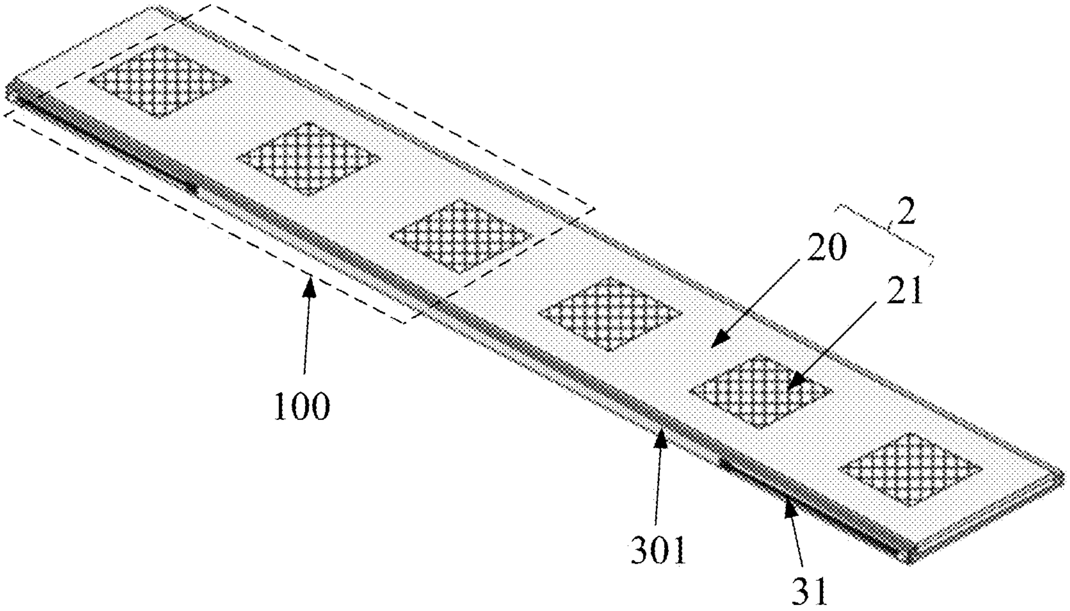
FIG. 1 is a top view of an antenna according to an embodiment of the present disclosure.
Figure 2:
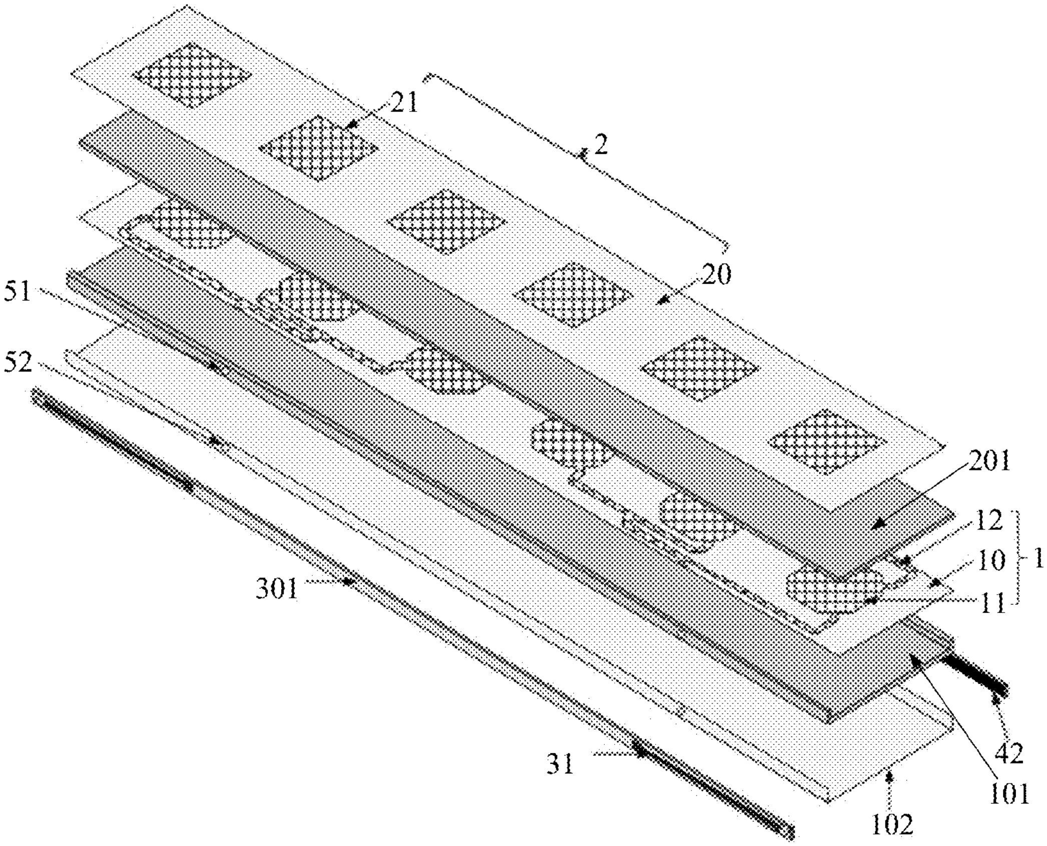
FIG. 2 is an exploded view of an antenna according to an embodiment of the present disclosure.
Figure 3:
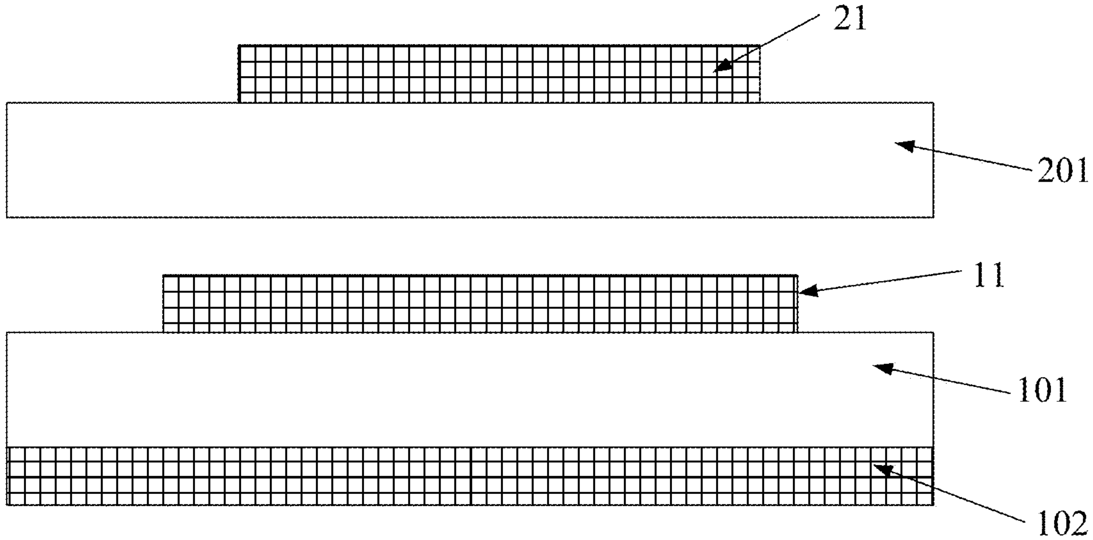
FIG. 3 is a cross-sectional view of an antenna according to an embodiment of the present disclosure.
Figure 4:
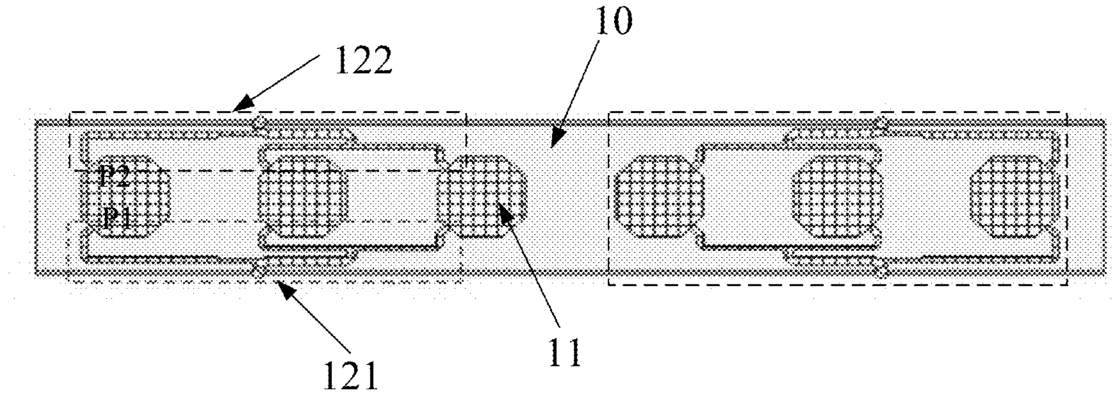
FIG. 4 is a top view of a first radiation layer according to an embodiment of the present disclosure.
Figure 5:
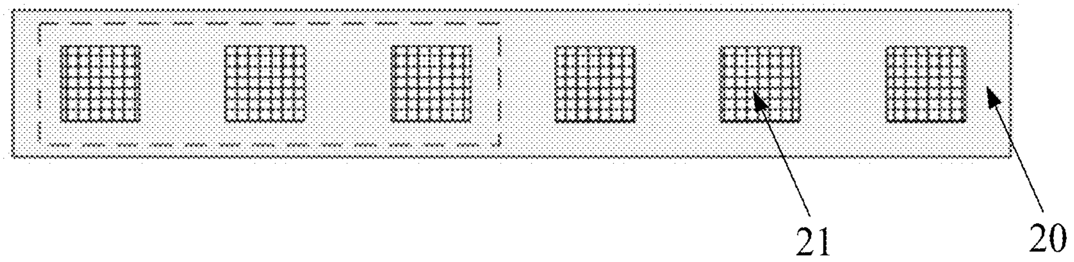
FIG. 5 is a top view of a second radiation layer according to an embodiment of the present disclosure.

In a first aspect, FIG. 1 is a top view of an antenna according to an embodiment of the present disclosure. FIG. 2 is an exploded view of an antenna according to an embodiment of the present disclosure. FIG. 3 is a cross-sectional view of an antenna according to an embodiment of the present disclosure. FIG. 4 is a top view of a first radiation layer 1 according to an embodiment of the present disclosure. FIG. 5 is a top view of a second radiation layer 2 according to an embodiment of the present disclosure. As shown in FIGS. 1 to 5, embodiments of the present disclosure provide an antenna, including a first substrate and a second substrate disposed opposite to each other. The first substrate includes a first dielectric substrate 101, a first radiation layer 1 and a first reference electrode layer 102; the first radiation layer 1 is arranged on the first dielectric substrate 101 and includes at least one first radiation portion 11 and at least one feed structure 12, and each of the at least one first radiation portion 11 is at least electrically connected to one of the at least one feed structure 12; the first reference electrode layer 102 is arranged on a side of the first dielectric substrate 101 away from the first radiation layer 1. The second substrate includes a second dielectric substrate 201 and a second radiation layer 2; the second dielectric substrate 201 is arranged on a side of the first radiation layer 1 away from the first dielectric substrate 101, and the second dielectric substrate 201 and the first radiation layer 1 have a first distance therebetween, that is, a certain distance exists between the second dielectric substrate 201 and the first radiation layer 1; the second radiation layer 2 is arranged on the second dielectric substrate 201, and the second radiation layer 2 includes at least one second radiation portion 21; an orthographic projection of each second radiation portion 21 on the first dielectric substrate 101 at least partially overlaps with an orthographic projection of the corresponding first radiation portion 11 on the first dielectric substrate 101; and orthographic projections of the at least one first radiation portion 11, the at least one feed structure 12 and the at least one second radiation portion 21 on the first dielectric substrate 101 all at least partially overlap with an orthographic projection of the first reference electrode layer 102 on the first dielectric substrate 101.

It should be noted that a transparent antenna in the embodiment of the present disclosure may be a receiving antenna, a transmitting antenna, or a transceiver antenna that are capable of simultaneously transmitting and receiving signals. The at least one first radiation portion 11 may include one or more first radiation portions 11; and the at least one second radiation portion 21 may include one or more second radiation portions 21. In the embodiment of the present disclosure, as an example, the at least one first radiation portion 11 may include a plurality of first radiation portions 11; and the at least one second radiation portion 21 may include a plurality of second radiation portions 21. In addition, in the embodiment of the present disclosure, as an example, the number of the first radiation portions 11 and the second radiation portions 21 is equal to each other, and the plurality of first radiation portions 11 and the plurality of second radiation portions 21 are in a one-to-one correspondence with each other.

When the antenna transmits a signal, a first feed port of the feed structure 12 receives a radio frequency signal, the feed structure 12 divides the radio frequency signal into a plurality of sub-signals, each sub-signal is output to the first radiation portion 11 through a second feed port connected to the first radiation portion 11, and the first radiation portion 11 feeds the sub-signal to the second radiation portion 21 directly opposite to the first radiation portion. When the antenna receives a signal, after receiving the radio frequency signal, any one of the second radiation portions 21 feed the radio frequency signal to the first radiation portion 11 directly opposite to the second radiation portion 21, and the second radiation portion 21 transmits the radio frequency signal to the first feed port through the second feed port connected to the first radiation portion 11.

It should be noted that a distance between the first radiation portion 11 and the second radiation portion 21 directly opposite to the first radiation portion should satisfy the requirement for the radiation rate of the antenna.

In the embodiment of the present disclosure, the plurality of second radiation portions 21 are disposed on the second dielectric substrate 201, that is, one dielectric substrate is provided between the first radiation portions 11 and the second radiation portions 21, so that the dielectric constant of the antenna can be effectively increased, and a capacitance between each first radiation portion 11 and the corresponding second radiation portion 21 is increased, thereby greatly reducing the overall cross section of the antenna.

Figure 8:
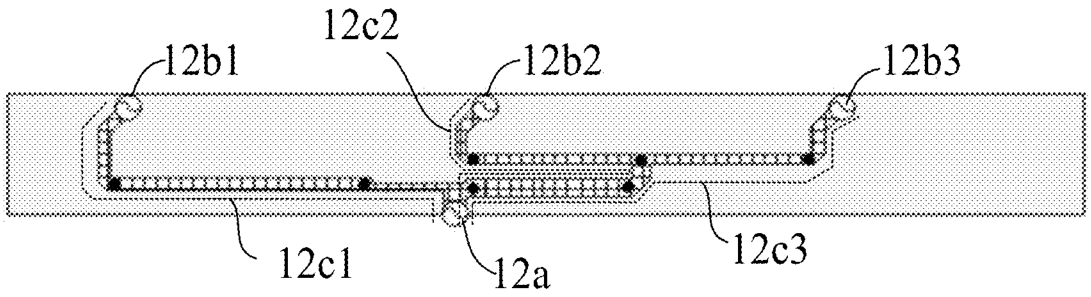
FIG. 8 is a top view of a feed structure in an antenna according to an embodiment of the present disclosure.

In some embodiments, FIG. 8 is a top view of a feed structure 12 in an antenna according to an embodiment of the present disclosure. As shown in FIGS. 4 and 8, the antenna in the embodiment of the present disclosure may be a dual-polarized antenna. In this case, each first radiation portion 11 is fed by two feed structures 12. For ease of understanding, the two feed structures 12 that feed the same first radiation portion 11 are referred to as a first feed structure 121 and a second feed structure 122, respectively. The first feed structure 121 and the second feed structure 122 each include one first feed port and at least one second feed port; each second feed port of the first feed structure 121 is connected to a corresponding first radiation portion 11 at a first node P1; each second feed port of the second feed structure 122 is connected to a corresponding first radiation portion 11 at a second node P2. For each first radiation portion 11, there is a certain angle between an extending direction of a connecting line between the first node P1 on the first radiation portion and a center of the first radiation portion 11 and an extending direction of a connecting line between the second node P2 on the first radiation portion and the center of the first radiation portion 11. That is, the first node P1, the second node P2, and a midline are not on the same straight line. That is, the first and second feed structures 121 and 122 have different feed directions for the same first radiation portion 11, thereby implementing the dual-polarized antenna.

Figure 6:
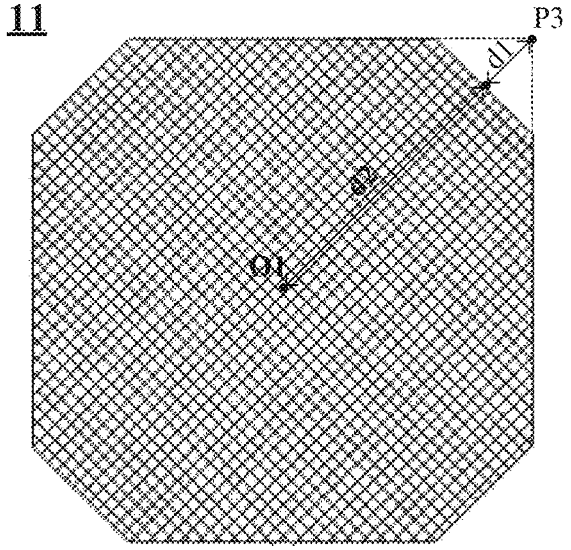
FIG. 6 is a top view of a first radiation portion in an antenna according to an embodiment of the present disclosure.
Figure 9:
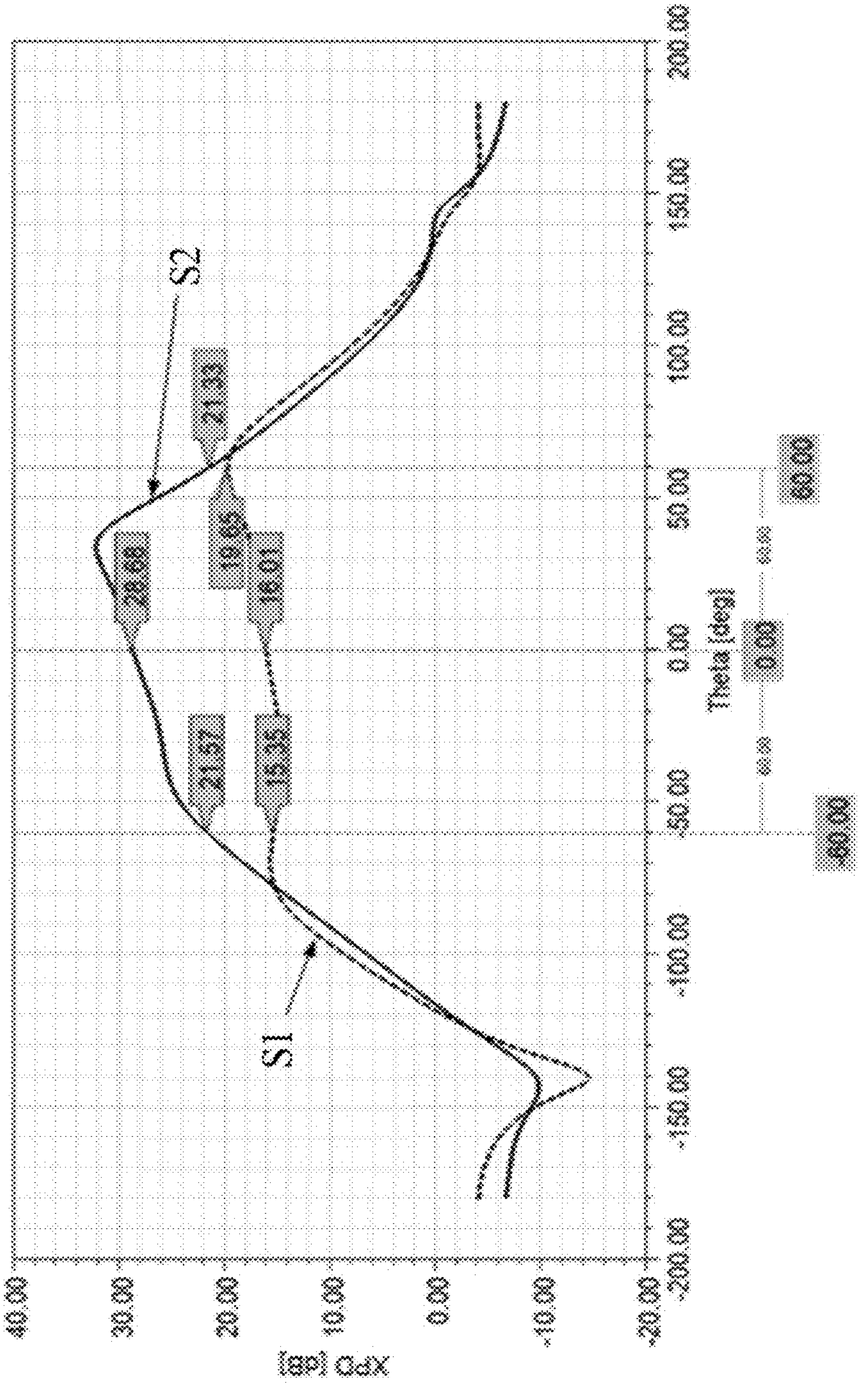
FIG. 9 is a schematic diagram illustrating a comparison in cross-polarization between an antenna having a first radiation patch with cut-off right angles and an antenna having a first radiation patch without cut-off right angles according to an embodiment of the present disclosure.

In some embodiments, outlines of the first radiation portion 11 and the second radiation portion 21 are both polygons, and may have the same or different shapes. In the embodiment of the present disclosure, the first radiation portion 11 and the second radiation portion 21 have different shapes. For example: FIG. 6 is a top view of the first radiation portion 11 in the antenna in the embodiment of the present disclosure. As shown in FIG. 6, the first radiation portion 11 has an octagonal outline, and the second radiation portion 21 has a quadrangular outline. Specifically, the outline of the first radiation portion 11 is polygonal, and each interior angle is larger than 90°. For example: the first radiation portion 11 has an octagonal outline and includes a first side, a second side, a third side, a fourth side, a fifth side, a sixth side, a seventh side, and an eighth side which are connected sequentially; an extending direction of the first side is the same as that of the fifth side, and is perpendicular to that of the third side. Each second feed port of the first feed structure 121 and each second feed port of the second feed structure 122 are connected on the second and fourth sides, respectively. In this case, the polygon is equivalent to a square whose four right angles are cut off to form flat chamfers, and the flat chamfers are formed so that the impedance matching is achieved to reduce loss. FIG. 9 is a schematic diagram illustrating a comparison of a cross-polarization for a first radiation patch with and without cut off right angles in an antenna according to an embodiment of the present disclosure. As shown in FIG. 9, compared with the first radiation portion 11 without cut off right angles, the cross components can be reduced with cut off right angles, and the cross-polarization ratio of the antenna can be improved.

In some embodiments, with continued reference to FIG. 6, the second, fourth, sixth, and eighth sides of the first radiation portion 11 have the same length, the first and fifth sides have the same length, and the third and seventh sides have the same length; a shortest distance from an intersection point P3 of extension lines of the first side and the third side to the flat chamfer is S1, and a shortest distance from the center O1 of the first radiation portion 11 to the second side is S2; a ratio of S1 and S2 depends on the required impedance, e.g., S2:S1=2:1.

Figure 7:
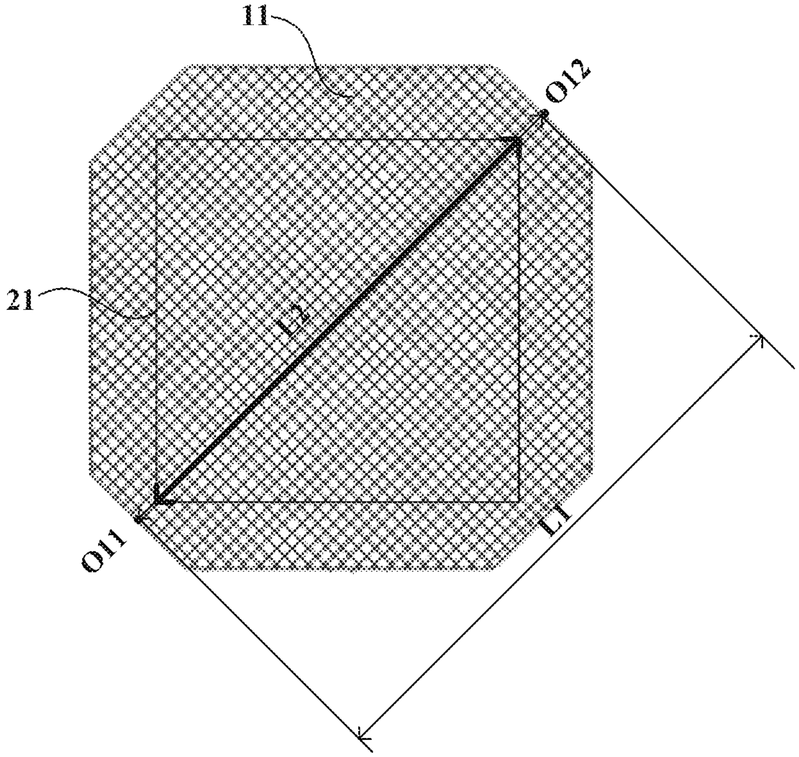
FIG. 7 is a schematic diagram illustrating a size relationship between a first radiation portion and a second radiation portion in an antenna according to an embodiment of the present disclosure.

Further, for the first radiation portion 11 and the second radiation portion 21 which are correspondingly arranged, the orthographic projection of the second radiation portion 21 on the first dielectric substrate 101 is positioned in the orthographic projection of the first radiation portion 11 on the first dielectric substrate 101. Further, orthographic projections of the center of the first radiation portion 11 and the center of the second radiation portion 21 on the first dielectric substrate 101 coincide with each other. In one example, FIG. 7 is a schematic diagram illustrating a size relationship between a first radiation portion 11 and a second radiation portion 21 in the antenna according to an embodiment of the present disclosure. As shown in FIG. 7, a ratio of a line connecting a midpoint O11 of the second side and a midpoint O12 of the sixth side of the first radiation portion 11 to a diagonal line of the second radiation portion 21 is in a range from 1.05:1 to 1.25:1, for example, 1.15:1.

In an embodiment, for each first radiation portion 11, when sizes of the flat chamfers of the first radiation portion 11 are the same, the second feed port of the first feed structure 121 and the second feed port of the second feed structure 122 are respectively connected to two adjacent flat chamfers. In this way, the first and second feed structures 121 and 122 have different feed directions for the same first radiation portion 11.

Further, for each first radiation portion 11, when the second feed port of the first feed structure 121 and the second feed port of the second feed structure 122 are respectively connected to midpoints of two adjacent flat chamfers, an extending direction of a connecting line of the first node P1 and the center on the first radiation portion 11 and an extending direction of a connecting line of the second node P2 and the center are perpendicular to each other. For example: the feed direction of the first feed structure 121 is a horizontal direction, and the feed direction of the second feed structure 122 is a vertical direction. Alternatively, the second feed port of the first feed structure 121 and the second feed port of the second feed structure 122 are not necessarily connected to the midpoints of two adjacent flat chamfers, so long as the extending direction of the connecting line between the node, at which the second feed port of the first feed structure 121 and the first radiation portion 11 are connected to each other, and the center of the first radiation portion 11, and the extending direction of the connecting line between the node, at which the second feed port of the second feed structure 122 and the first radiation portion 11 are connected to each other, and the center of the first radiation portion 11, do not coincide with each other.

In some embodiments, with continued reference to FIG. 4, the first and second feed structures 121 and 122 are respectively disposed on both sides of the corresponding first radiation portion 11, and are mirror-symmetrical with respect to a perpendicular bisector that penetrates one side of one first radiation portion 11 as a symmetry axis. With such arrangement, devices on the first dielectric substrate 101 are evenly distributed, which can obtain a better radiation direction and a better gain, and can also ensure the even optical transmittance of the transparent antenna.

In some embodiments, as shown in FIG. 1, the antenna of the embodiments of the present disclosure includes a plurality of sub-arrays 100, each of which includes at least one first radiation portion 11 and at least one second radiation portion 21, and each first radiation portion 11 in each sub-array 100 is fed by one first feed structure 121 and one second feed structure 122, and the first radiation portions 11 in different sub-arrays 100 are fed by different first feed structures 121 and different second feed structures 122. As shown in FIG. 1, in the embodiment of the present disclosure, as an example, each sub-array 100 includes a plurality of first radiation portions 11 and a plurality of second radiation portions 21. In FIG. 1, as an example, three first radiation portions 11 and three second radiation portions 21, which are disposed in one-to-one correspondence, are included in each sub-array 100, which does not constitute a limitation to the embodiment of the present disclosure. Accordingly, the number of first radiation portions 11 in each sub-array 100 determines the number of second feed ports in the first feed structure 121 and the second feed structure 122 in the sub-array 100. As shown in FIG. 8, each feed structure 12 includes one first feed port 12*a* and three second feed ports 12*b*1/12*b*2/12*b*3.

In some embodiments, since first radiation portions 11 in each sub-array 100 are fed by the same first feed structure 121 and the same second feed structure 122 (for convenience of description, the first feed structure 121 and the second feed structure 122 in each sub-array 100 are collectively referred to the feed structures 12), and the first radiation portions 11 are arranged side by side. At least a part of branch lines from the first feed port of each feed structure 12 to the second feed ports are different in line length. In order that the power of the radio frequency signals fed by the first radiation portions 11 are equal or approximately equal to each other, it is necessary to adjust line widths of the branch lines, so that an impedance difference between any two branch lines of each sub-array is in a range from 0.9Ω to 1.1Ω.

For example: with continued reference to FIG. 8, each sub-array 100 includes three first radiation portions 11, and each feed structure 12 is a one-to-three power divider, that is, each feed structure 12 includes three branch lines 12*c*1/12*c*2/12*c*3, where the line length of one branch line 12*c*1 is different from the line lengths of the other two branch lines 12*c*2 and 12*c*3 and specifically, is smaller than the line lengths of the other two branch lines 12*c*2 and 12*c*3, so that the line width of a part of the shorter branch line may be designed to be a narrower line width, so that the impedance differences among the three branch lines 12*c*1/12*c*2/12*c*3 are not greatly different, thereby realizing equal power dividing of the radio frequency signal.

Figure 10:
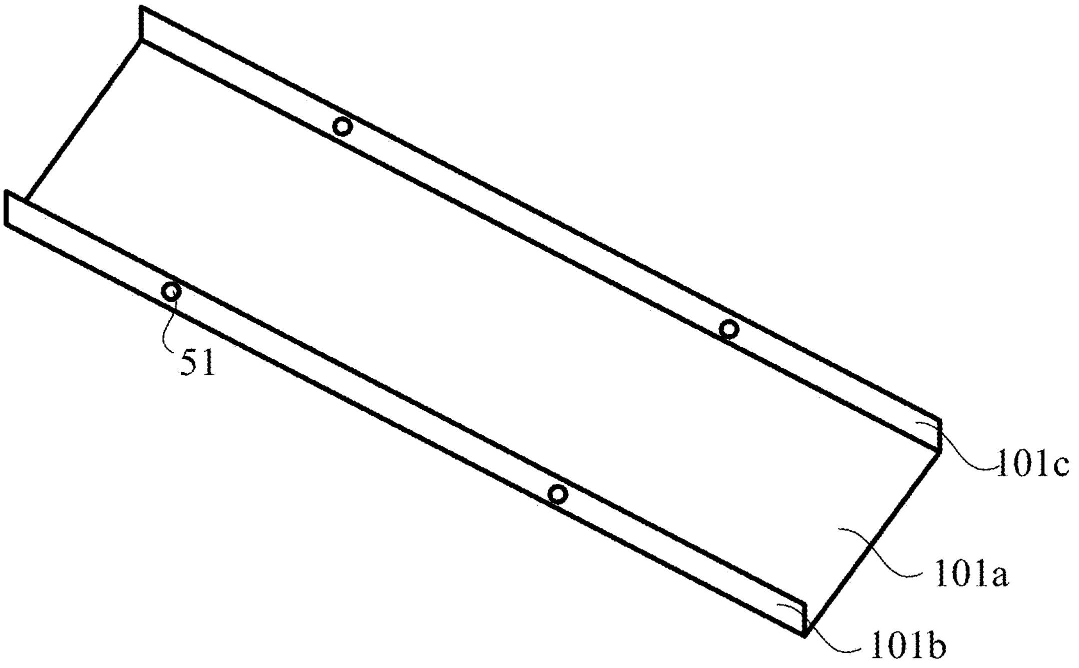
FIG. 10 is a schematic diagram of a first dielectric substrate in an antenna according to an embodiment of the present disclosure.
Figure 11:
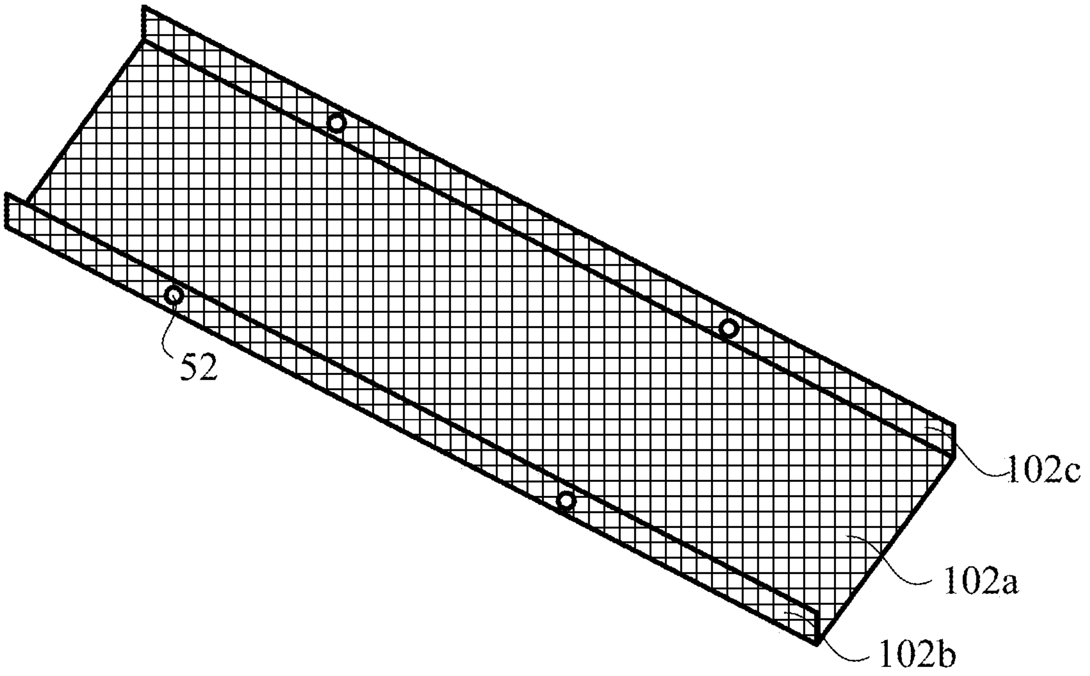
FIG. 11 is a schematic diagram of a first reference electrode layer in an antenna according to an embodiment of the present disclosure.
Figure 12:
FIG. 12 is a schematic diagram of a third dielectric substrate and a first transmission line in an antenna according to an embodiment of the present disclosure.

In some embodiments, FIG. 10 is a schematic diagram of a first dielectric substrate 101 in an antenna according to an embodiment of the present disclosure. FIG. 11 is a schematic diagram of a first reference electrode layer 102 in an antenna according to an embodiment of the present disclosure. FIG. 12 is a schematic diagram of a third dielectric substrate 301 and a first transmission line 31 in an antenna according to an embodiment of the present disclosure. As shown in FIGS. 10 to 12, the first dielectric substrate 101 includes a first bottom plate 101*a*, a first side plate 101*b* and a second side plate 101*c*, the first bottom plate 101*a* includes a first side surface and a second side surface extending in a first direction and disposed opposite to each other in a second direction, the first side plate 101*b* is connected to the first side surface, and the second side plate 101*c* is connected to the second side surface; an extending plane B of the first side plate 101*b* and an extending plane C of the second side plate 101*c* intersect with an extending plane A of the first bottom plate 101*a*. The first reference electrode layer 102 matches with the first dielectric substrate 101, and includes a first reference sub-electrode 102*a* disposed opposite to the first bottom plate 101*a*, a second reference sub-electrode 102*b* disposed opposite to the first side plate 101*b*, and a third reference sub-electrode 102*c* disposed opposite to the second side plate 101*c*. A third dielectric substrate 301 is disposed on a side of the second reference sub-electrode 102*b* away from the first side plate 101*b*, and a fourth dielectric substrate 302 is disposed on a side of the third reference sub-electrode 102*c* away from the second side plate 101*c*; and at least one first transmission line 31 is disposed on a side of the third dielectric substrate 301 away from the second reference sub-electrode 102*b*, and at least one second transmission line is disposed on a side of the fourth dielectric substrate away from the third reference sub-electrode 102*c*. One end of one first transmission line 31 is electrically connected to the first feed port of the corresponding first feed structure 121 through a first via; the first via penetrates through the first side plate 101*b*, the second reference sub-electrode 102*b* and the third dielectric substrate 301, that is, the first via includes a first sub-via 51 penetrating through the first side plate 101*b*, a second sub-via 52 penetrating through the second reference sub-electrode 102*b* and a third sub-via 53 penetrating through the third dielectric substrate 301. One end of one second transmission line is electrically connected to the first feed port of the corresponding second feed structure 122 through a second via; the second via penetrates through the second side plate 101*c*, the third reference sub-electrode 102*c* and the fourth dielectric substrate, that is, the second via includes a fourth sub-via penetrating through the second side plate 101*c*, a fifth sub-via penetrating through the third reference sub-electrode 102*c* and a sixth sub-via penetrating through the fourth dielectric substrate.

Further, the first transmission lines 31 and the second transmission lines are respectively disposed in one-to-one correspondence with the sub-arrays 100, that is, each sub-array 100 feeds the first feed port of the first feed structure 121 through the corresponding first transmission line 31, and feeds the first feed port of the second feed structure 122 through the corresponding second transmission line. In some embodiments, the first transmission line 31 and the first feed port of the first feed structure 121 may be electrically connected to each other by soldering; similarly, the second transmission line and the first feed port of the second feed structure 122 may also be electrically connected to each other by soldering.

Further, the third dielectric substrate 301 and the first side plate 101*b* may be fixed together by a screw; and similarly, the fourth dielectric substrate and the second side plate 101*c* may also be fixed together by a screw. In some embodiments, a second reference electrode layer 41 is disposed on a side of the third dielectric substrate 301 close to the second reference sub-electrode 102*b*, and a third reference electrode layer 42 is disposed on a side of the fourth dielectric substrate close to the third reference sub-electrode 102*c*. The second reference electrode layer may be attached to the third dielectric substrate 301 and has a planar structure, but it should be understood that an opening is formed at a position corresponding to the via in the second reference electrode layer; similarly, the third reference electrode layer 42 may be attached to the fourth dielectric substrate and has a planar structure, but it should be understood that an opening is formed at a position corresponding to the via in the third reference electrode layer 42. The second reference electrode layer and the third reference electrode layer 42 are formed on the third dielectric substrate 301 and the fourth dielectric substrate, respectively, so as to avoid the problem of inconsistent electric potentials on the first transmission line 31 and the second transmission line when the second reference sub-electrode 102*b* and the third reference sub-electrode 102*c* are warped.

In some embodiments, the third dielectric substrate 301 and the fourth dielectric substrate may each employ a PCB (Printed Circuit Board).

In some embodiments, with continued reference to FIG. 4, the first radiation layer 1 further includes a first base material 10, the first radiation portions 11 and the feed structures 12 are disposed on the first base material 10, and the first base material 10 and the first dielectric substrate 101 are adhered together by a first adhesive layer 1100. With continued reference to FIG. 5, the second radiation layer may include a second base material 20, the second radiation portions 21 are disposed on the second base material 20, and the second base material 20 is adhered to the second dielectric substrate 201 by a second adhesive layer 2100.

Materials of the first base material 10 and the second base material 20 may be the same or different; for example, the first base material 10 and the second base material 20 are flexible films made of materials including, but not limited to, polyethylene terephthalate (PET) or polyimide (PI), copolymers of cycloolefin (COP), or the like. In the embodiments of the present disclosure, as an example, the first base material 10 and the second base material 20 are made of PET. The first base material 10 and the second base material 20 each have a thickness in a range of about 50 μm to 250 μm.

The first dielectric substrate 101 and the second dielectric substrate 201 can provide good support, and therefore, may be made of polycarbonate (PC) or polymethyl methacrylate (PMMA). The first dielectric substrate 101 and the second dielectric substrate 201 have a thickness in a range of about 1 mm to 3 mm.

Materials of the first adhesive layer and the second adhesive layer may be the same or different, for example: the first adhesive layer and the second adhesive layer may be made of optically clear adhesive (OCA).

Figure 13:
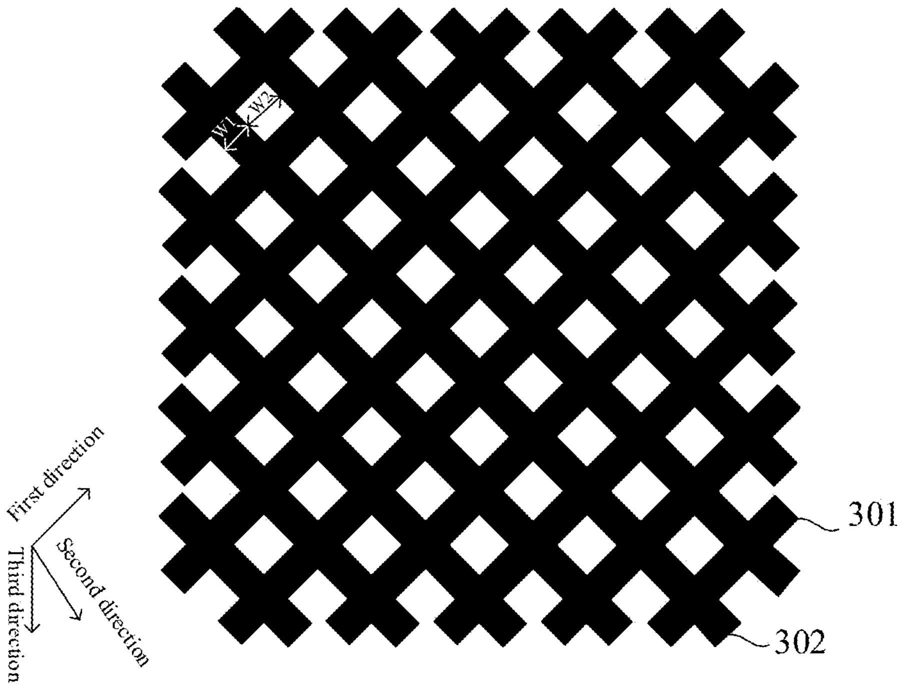
FIG. 13 is a schematic diagram of a metal mesh structure according to an embodiment of the present disclosure.

In some embodiments, FIG. 13 is a schematic diagram of a metal mesh structure according to an embodiment of the present disclosure. As shown in FIG. 13, the first radiation portions 11, the second radiation portions 21, the feed structures 12, and the first reference electrode layer 102 may all adopt a metal mesh structure, and orthographic projections of hollowed out portions of the metal mesh structure of each of the first radiation portions 11, the second radiation portions 21, the feed structures 12 on the first dielectric substrate 101 may overlap with orthographic projections of hollowed out portions of the metal mesh structure of the first reference electrode layer 102 on the first dielectric substrate 101, so that the optical transmittance of the antenna can be improved. For example: the metal mesh structure of the embodiment of the present disclosure can realize the optical transmittance in a range from 70% to 88%.

Further, the metal mesh structure may include a plurality of first metal lines and a plurality of second metal lines crossing with the plurality of first metal lines. The first metal lines are arranged side by side along a first direction and extend along a second direction; the second metal lines are arranged side by side along the first direction and extend along a third direction.

In some embodiments, ends of the first metal lines and the second metal lines of the first radiation portion 11 are connected together, that is, the periphery of the first radiation portion 11 is a closed loop structure. In an actual product, the ends of the first metal lines and the second metal lines of the first radiation portion 11 may not be connected to each other, that is, the periphery of the first radiation portion 11 is radial. Similarly, the metal meshes of the other elements may be arranged in the same manner as the first radiation portion 11, and therefore, the description thereof is not repeated.

Extending directions of each first metal line and each second metal line of the metal mesh structure may be perpendicular to each other, thereby forming square or rectangular hollowed out portions. Alternatively, the extending directions of each first metal line and each second metal line of the metal mesh structure may not be perpendicular to each other. For example: an angle between the extending directions of the first metal line and the second metal line is 45 degrees, thereby forming rhombic hollowed out portions.

In some embodiments, line widths, line thicknesses, and line spacings of the first metal lines and the second metal lines of the metal mesh structure are preferably the same, but may be different. For example: with reference to FIG. 13, each of the first metal line and the second metal line has the line width W1 in a range from about 1 μm to 30 μm, and the line spacing W2 in a range from about 50 μm to 250 μm; the line thickness in a range from about 0.5 μm to 10 μm. The metal mesh structure may be formed on the first base material 10 and/or the second base material 20 through a process including, but not limited to, an imprinting process or an etching process.

Figure 14:
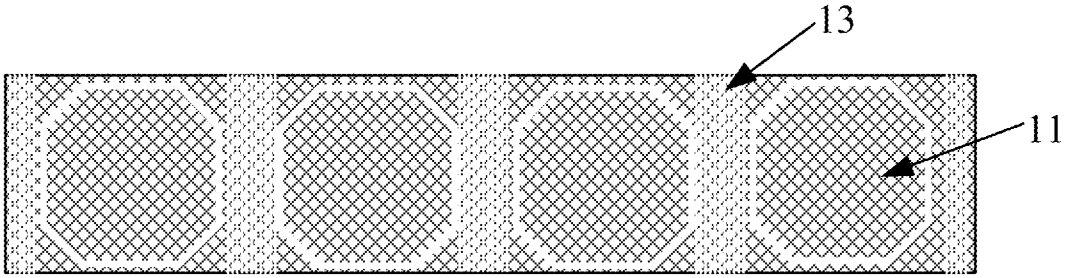
FIG. 14 is a schematic diagram of a part of a first radiation layer in an antenna according to an embodiment of the present disclosure.

In some embodiments, FIG. 14 is a schematic diagram of a part of a first radiation layer 1 in an antenna according to an embodiment of the present disclosure. As shown in FIG. 14, the first radiation layer 1 includes a metal mesh, which may include a plurality of first metal lines and a plurality of second metal lines crossing with the plurality of first metal lines. The first metal lines are arranged side by side along the first direction and extend along the second direction; the second metal lines are arranged side by side along the first direction and extend along the third direction. The first radiation layer 1 includes the plurality of first radiation portions 11, first redundant radiation electrodes, and the feed structures 12 (not shown), and the first redundant radiation electrodes and the first radiation portions 11 are disconnected from each other, that is, the first metal lines and the second metal lines are disconnected from each other at a position where the first redundant radiation electrodes and the first radiation portions 11 are disconnected from each other. The first metal lines and the second metal lines in the first radiation layer 1 are disconnected from each other at the position where the second metal lines cross with the first metal lines. In this case, the first radiation portions 11 and the first redundant radiation electrodes may be formed through one patterning process, and may be formed by forming a full layer of first and second metal lines crossing with each other, and then performing a cutting process on the first and second metal lines. In some embodiments, a width of a portion of each of the first metal lines and the second metal lines in the first radiation layer 1 at a position, where the first metal lines and the second metal lines are disconnected from each other, is in a range from about 1 um to 30 um. Alternatively, the width of the portion of each of the first metal lines and the second metal lines in the first radiation layer 1 at the position, where the first metal lines and the second metal lines are disconnected from each other, may also be specifically defined according to the radiation requirements of the antenna.

In some embodiments, materials of the first reference electrode layer 102, the first radiation portions 11, the second radiation portions 21, the feed structures 12, the second reference electrode layer, and the third reference electrode layer 42 include, but are not limited to, metal materials such as copper, silver, aluminum, or the like, which are not limited in the embodiments of the present disclosure.

Figure 15:
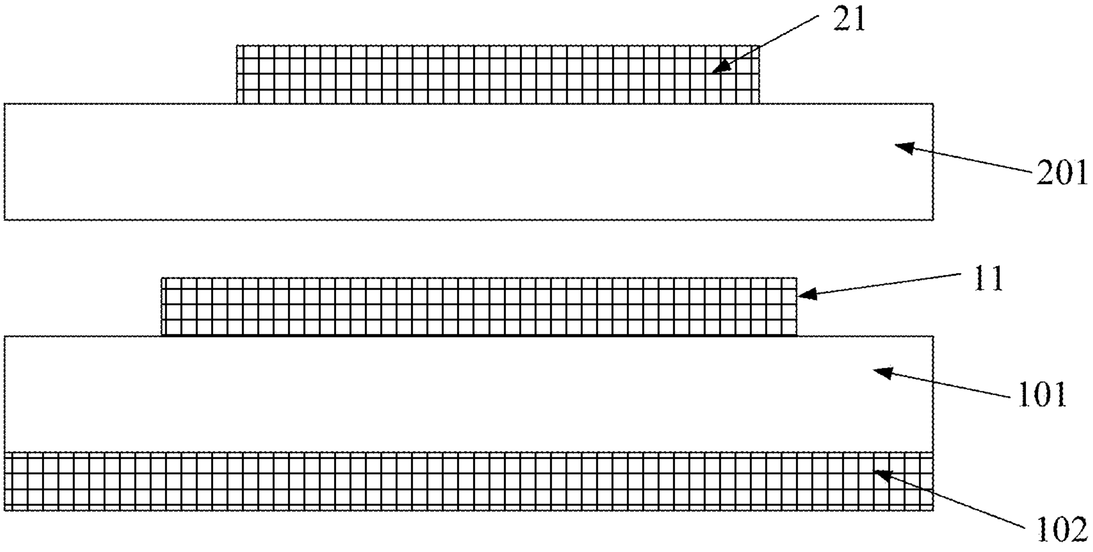
FIG. 15 is a cross-sectional view of an antenna according to an embodiment of the present disclosure.

In some embodiments, FIG. 15 is another cross-sectional view of an antenna according to an embodiment of the present disclosure. As shown in FIG. 15, the antenna further includes a housing 60 arranged on a side of the second radiation layer 2 away from the second dielectric substrate 201. Material of the housing 60 may be polycarbonate (PC) or polymethyl methacrylate (PMMA).

In order to make clearer the structure and the effect of the transparent antenna of the embodiment of the present disclosure, a specific structure of the transparent antenna is given below.

Figure 16:
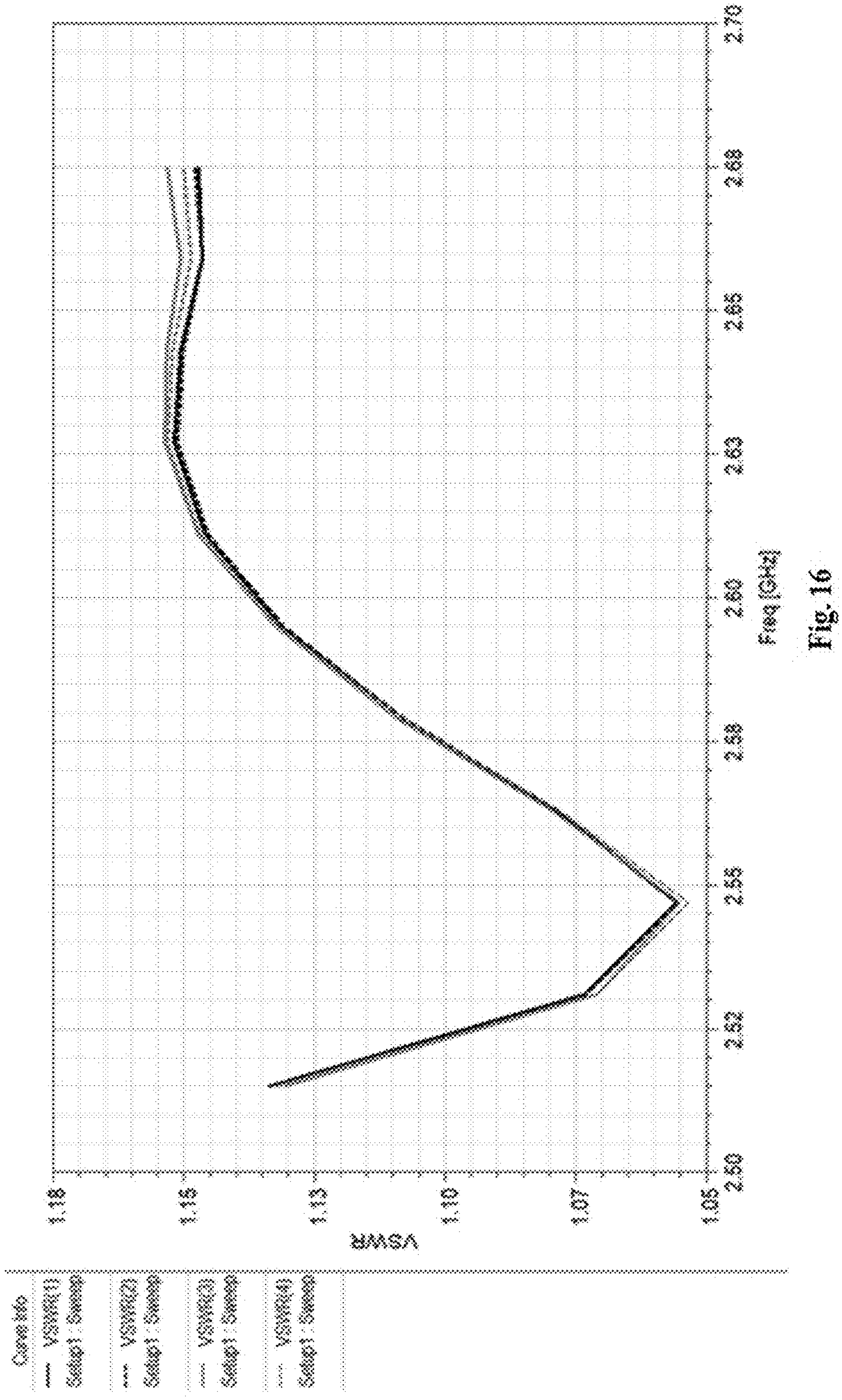
FIG. 16 is a graph of a standing wave of an antenna according to an embodiment of the present disclosure.
Figure 17:
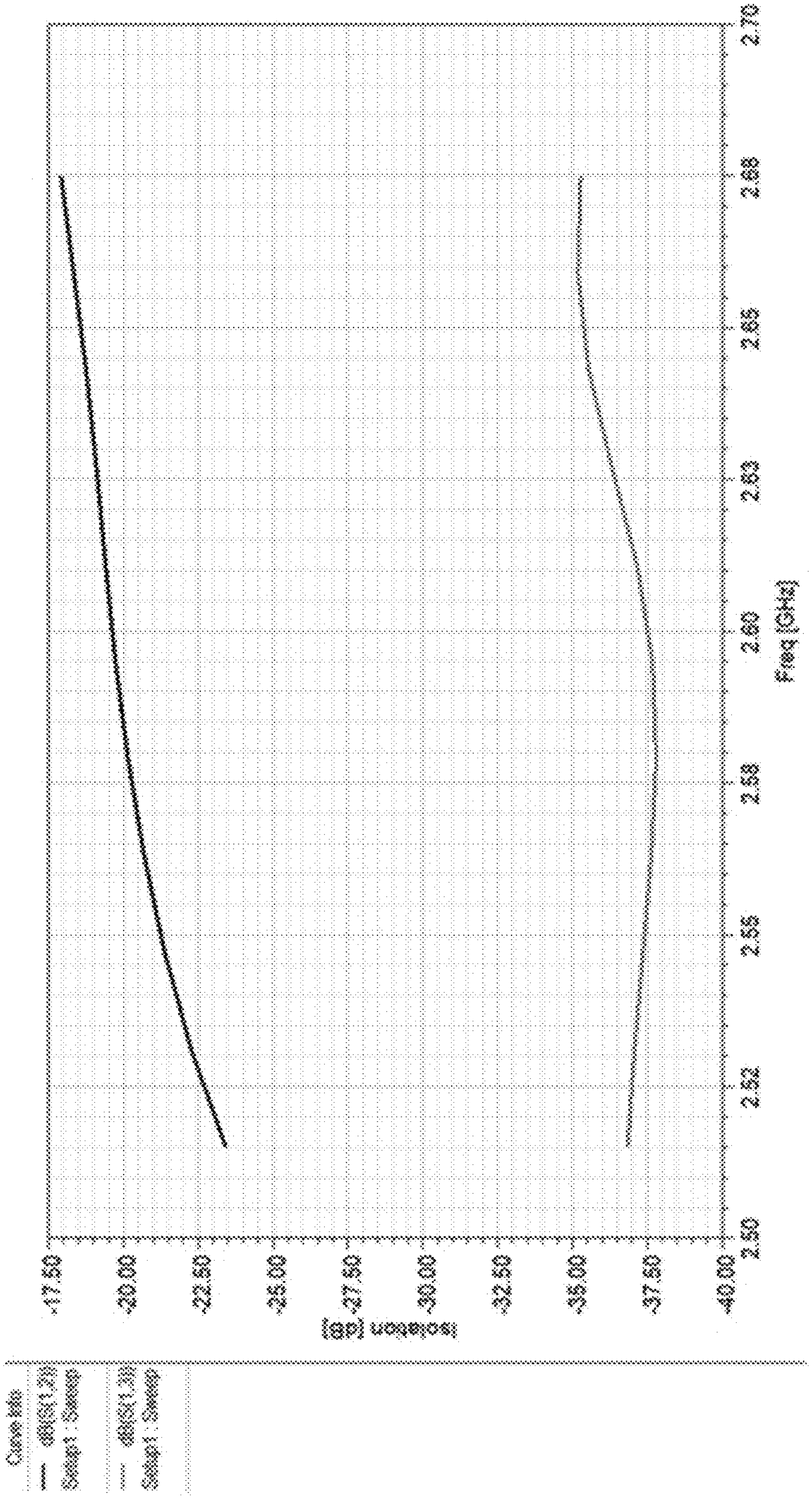
FIG. 17 is a graph of an isolation of an antenna according to an embodiment of the present disclosure.
Figure 18:
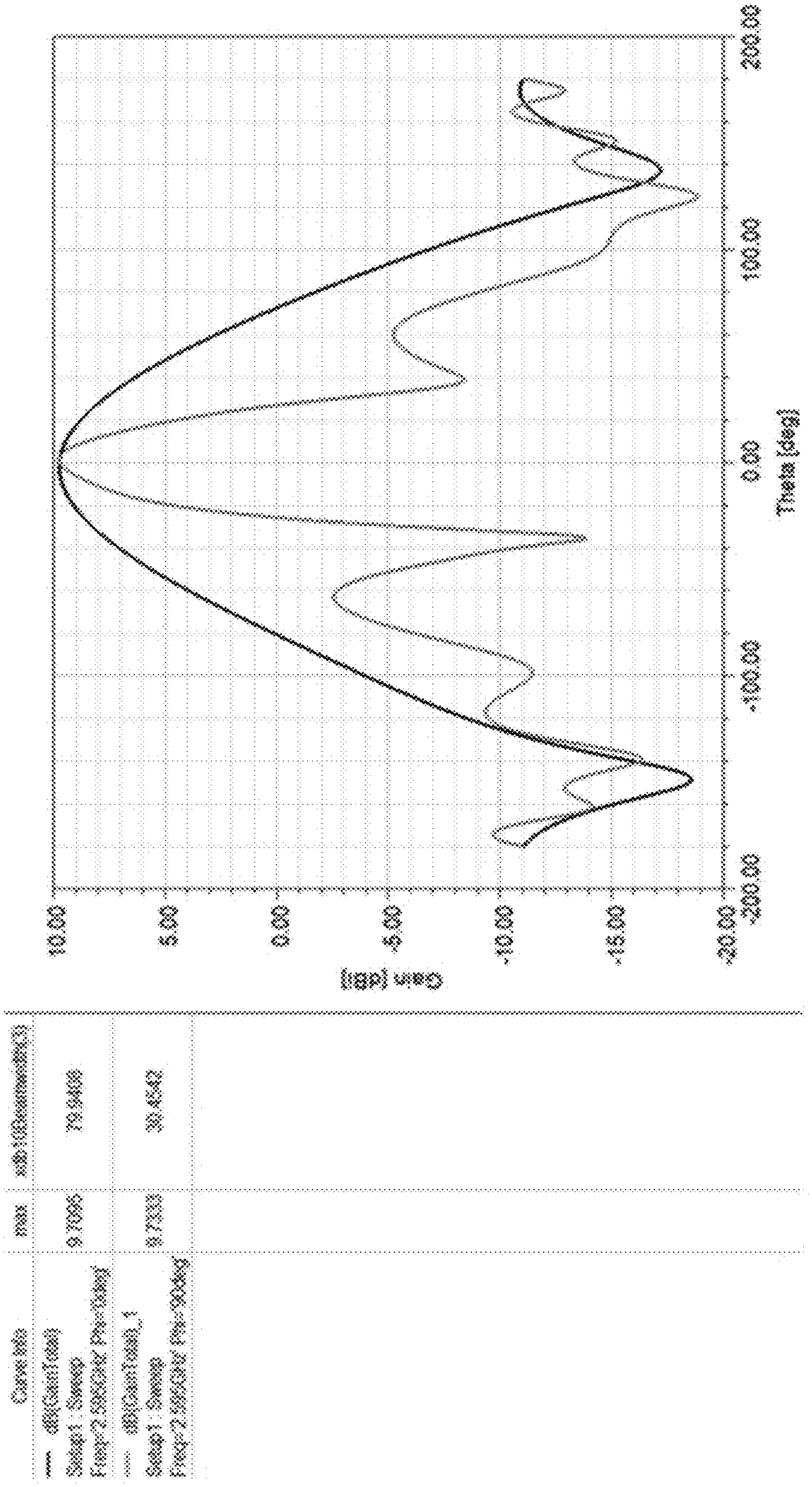
FIG. 18 is a radiation pattern of an antenna in a horizontal plane and a vertical plane at a center frequency according to an embodiment of the present disclosure.
Figure 19:
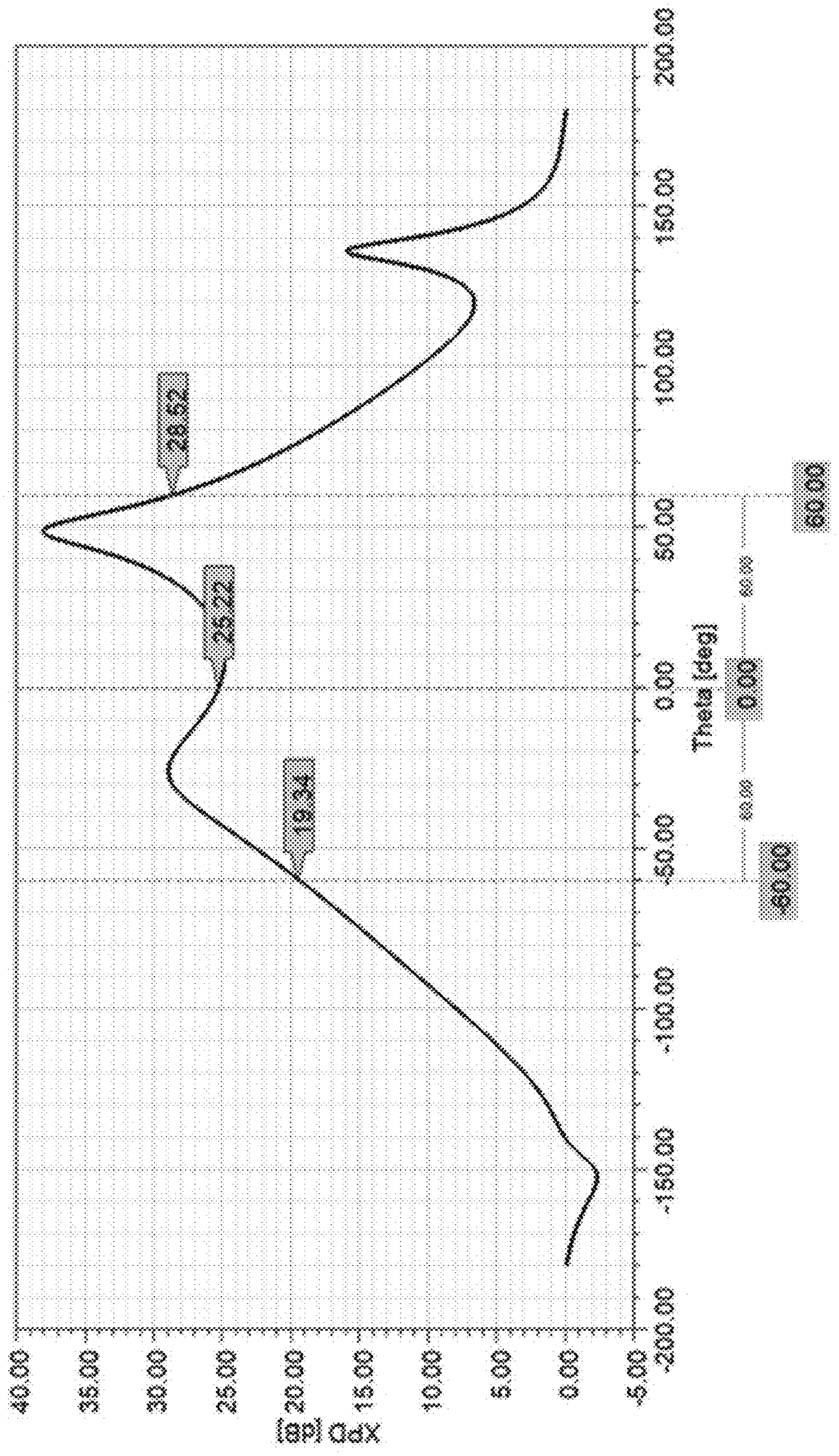
FIG. 19 is a graph of a cross-polarization ratio of an antenna at a center frequency according to an embodiment of the present disclosure.

As shown in FIGS. 1 to 5 and 10 to 12, the antenna has a size of 370 mm×70 mm ($3.2\lambda_0 \times 0.6\lambda_0$; $\lambda_0$ is free space wavelength). The antenna mainly includes the first reference electrode layer 102, two sub-arrays 100, the third dielectric substrate 301 and the fourth dielectric substrate, wherein the third dielectric substrate 301 and the fourth dielectric substrate are both PCB. The first radiation portions 11 are the first radiation portions 11 shown in FIG. 6. FIG. 16 is a graph of a standing wave of an antenna according to an embodiment of the present disclosure. As shown in FIG. 16, the VSWR (Voltage Standing Wave Ratio) of the antenna in the embodiment of the present disclosure in the D band (in a range from 2515MH to 2675 MHz) is lower than 1.2. FIG. 17 is a graph of an isolation of an antenna according to an embodiment of the present disclosure. As shown in FIG. 17, the antenna according to the embodiment of the present disclosure can achieve an in-band isolation greater than 17.5 dB, which effectively improves the signal crosstalk resistant function. FIG. 18 is a radiation pattern of an antenna in a horizontal plane and a vertical plane at a center frequency according to an embodiment of the present disclosure. As shown in FIG. 18, the antenna in the embodiment of the present disclosure has a radiation gain higher than 9.7 dBi at the center frequency. 3 dB beam widths in the horizontal plane and the vertical plane are 800 and 30°, respectively, thereby realizing the excellent signal coverage. FIG. 19 is a graph of a cross-polarization ratio of an antenna at a center frequency according to an embodiment of the present disclosure. As shown in FIG. 19, the antenna in the embodiment of the present disclosure has a cross-polarization ratio in an axial direction (0°) of greater than 25 dB, and a cross-polarization ratio in ±600 directions of greater than 19 dB. The signal resolving power of the base station system end is greatly improved.

Figure 20:
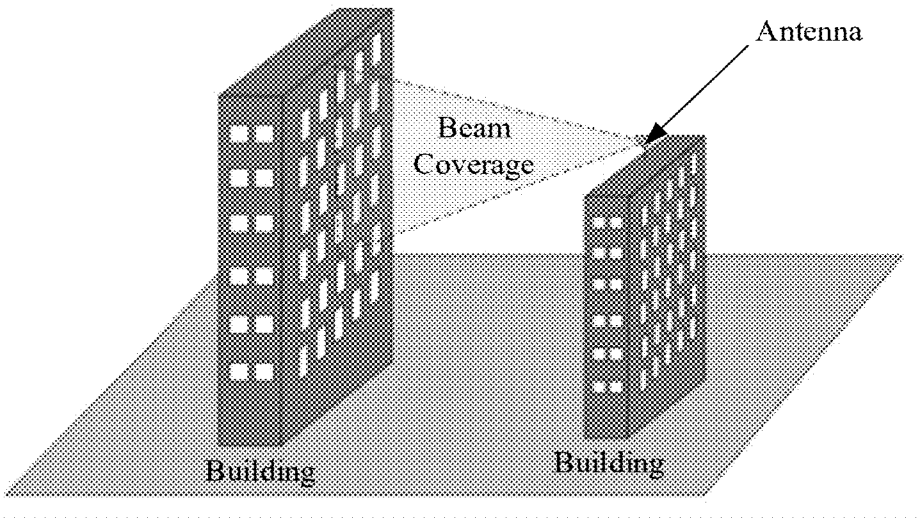
FIG. 20 is a schematic diagram of an application scenario of an antenna according to an embodiment of the present disclosure.

In a second aspect, an embodiment of the present disclosure provides an electronic device which includes the antenna; the antenna may be fixed on a building, as shown in FIG. 20.

In some embodiments, the electronic device provided by an embodiment of the present disclosure further includes a transceiver unit, a radio frequency transceiver, a signal amplifier, a power amplifier, and a filtering unit. The transparent antenna 1 in the electronic device may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by the transparent antenna 1 in the electronic device and is processed by the filtering unit, the power amplifier, the signal amplifier and the radio frequency transceiver, the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the transparent antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the transparent antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one transparent antenna 1. In the process of transmitting signals by the electronic device, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the transparent antenna, and the transparent antenna 1 radiates the signals. In the process of receiving signals by the electronic device, the signals received by the transparent antenna 1 are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the transparent antenna. The signals received by the transparent antenna are processed by the power amplifier and the signal amplifier and then transmitted to the radio frequency transceiver, and the radio frequency transceiver transmits the signals to the transceiver unit.

In some embodiments, the signal amplifier may include various types of signal amplifiers, such as a low noise amplifier, without limitation.

In some embodiments, the electronic device provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. An antenna, comprising a first substrate and a second substrate opposite to each other; wherein the first substrate comprises:

a first dielectric substrate;

a first radiation layer on the first dielectric substrate and comprising at least one first radiation portion and at least one feed structure; wherein each of the at least one first radiation portion is at least electrically connected to one of the at least one feed structure; and a first reference electrode layer on a side of the first dielectric substrate away from the first radiation layer; and the second substrate comprises:

a second dielectric substrate on a side of the first radiation layer away from the first dielectric substrate, wherein the second dielectric substrate is separated from the first radiation layer by a first distance; and a second radiation layer on the second dielectric substrate and comprising at least one second radiation portion; wherein an orthographic projection of each second radiation portion on the first dielectric substrate at least partially overlaps with an orthographic projection of a corresponding first radiation portion on the first dielectric substrate; and orthographic projections of the at least one first radiation portion, the at least one feed structure and the at least one second radiation portion on the first dielectric substrate all at least partially overlap with an orthographic projection of the first reference electrode layer on the first dielectric substrate;

wherein the at least one feed structure comprises a first feed structure and a second feed structure; the first feed structure and the second feed structure each comprise one first feed port and at least one second feed port;

one second feed port of the first feed structure is connected to one of the at least one first radiation portion at a first node; one second feed port of the second feed structure is connected to the first radiation portion at a second node; and for the first radiation portion, there is an angle between an extending direction of a connecting line between the first node on the first radiation portion and a center of the first radiation portion and an extending direction of a connecting line between the second node on the first radiation portion and the center of the first radiation portion;

wherein the first dielectric substrate comprises a first bottom plate, a first side plate and a second side plate, the first bottom plate comprises a first side surface and a second side surface extending in a first direction and opposite to each other in a second direction, the first side plate is connected to the first side surface, and the second side plate is connected to the second side surface; planes where the first side plate and the second side plate are located intersect with a plane where the first bottom plate is located;

the first reference electrode layer matches with the first dielectric substrate, and comprises a first reference sub-electrode opposite to the first bottom plate, a second reference sub-electrode opposite to the first side plate, and a third reference sub-electrode opposite to the second side plate;

a third dielectric substrate is on a side of the second reference sub-electrode away from the first side plate, and a fourth dielectric substrate is on a side of the third reference sub-electrode away from the second side plate; and at least one first transmission line is on a side of the third dielectric substrate away from the second reference sub-electrode, and at least one second transmission line is on a side of the fourth dielectric substrate away from the third reference sub-electrode;

one end of each first transmission line is electrically connected to the first feed port of the corresponding first feed structure through a first via extending through the first side plate, the second reference sub-electrode and the third dielectric substrate; and one end of each second transmission line is electrically connected to the first feed port of the corresponding second feed structure through a second via extending through the second side plate, the third reference sub-electrode and the fourth dielectric substrate.

2. The antenna of claim 1, wherein the antenna comprises a plurality of sub-arrays, each of which comprises one or more first radiation portions and one or more second radiation portions, and the one or more first radiation portions in each sub-array are fed by one first feed structure and one second feed structure, and the first radiation portions in different sub-arrays are fed by different first feed structures and different second feed structures.

3. The antenna of claim 2, wherein each feed structure comprises a plurality of branch lines from the first feed port to the at least one second feed port; at least a part of the plurality of branch lines have different line lengths; and an impedance difference between any two branch lines of each sub-array is in a range from 0.9Ω to 1.1 Ω.

4. The antenna of claim 1, wherein for the first radiation portion, the extending direction of the connecting line between the first node on the first radiation portion and the center of the first radiation portion is perpendicular to the extending direction of the connecting line between the second node on the first radiation portion and the center of the first radiation portion.

5. The antenna of claim 1, wherein each first radiation portion comprises a polygon, and any interior angle of the polygon is greater than 90°.

6. The antenna of claim 5, wherein the polygon comprises a first side, a second side, a third side, a fourth side, a fifth side, a sixth side, a seventh side, and an eighth side which are connected sequentially; an extending direction of the first side is the same as that of the fifth side, and is perpendicular to that of the third side; one corresponding second feed port of the first feed structure and one corresponding second feed port of the second feed structure are connected onto the second side and the fourth side, respectively.

7. The antenna of claim 6, wherein a ratio of a line connecting a midpoint of the second side and a midpoint of the sixth side of each first radiation portion to a diagonal line of the corresponding second radiation portion is in a range from 1.05:1 to 1.25:1.

8. The antenna of claim 1, further comprising a second reference electrode layer on a side of the third dielectric substrate adjacent to the second reference sub-electrode, and a third reference electrode layer on a side of the fourth dielectric substrate adjacent to the third reference sub-electrode.

9. The antenna of claim 1, wherein the first radiation layer further comprises a first base material, the at least one first radiation portion is on the first base material, and the first base material is attached to the first dielectric substrate by a first adhesive layer.

10. The antenna of claim 1, wherein the second radiation layer further comprises a second base material, the at least one second radiation portion is on the second base material, and the second base material is attached to the second dielectric substrate by a second adhesive layer.

11. The antenna of claim 1, wherein at least one of the at least one first radiation portion, the at least one second radiation portion and the first reference electrode layer comprises a metal mesh structure.

12. The antenna of claim 11, wherein the at least one first radiation portion, the at least one second radiation portion, and the first reference electrode layer each comprise the metal mesh structure, and orthographic projections of hollowed out portions of the metal mesh structures of the at least one first radiation portion, the at least one second radiation portion, and the first reference electrode layer on the first dielectric layer at least partially overlap with each other.

13. The antenna of claim 12, wherein the metal mesh structure has a line width in a range of 2 μm to 30 μm; a line spacing in a range of 50 μm to 200 μm; and a line thickness in a range of 1 μm to 10 μm.

14. An electronic device, comprising the antenna of claim 1.

15. An antenna, comprising a first substrate and a second substrate opposite to each other; wherein the first substrate comprises:

a first dielectric substrate;

a first radiation layer on the first dielectric substrate and comprising at least one first radiation portion and at least one feed structure; wherein each of the at least one first radiation portion is at least electrically connected to one of the at least one feed structure; and a first reference electrode layer on a side of the first dielectric substrate away from the first radiation layer; and the second substrate comprises:

a second dielectric substrate on a side of the first radiation layer away from the first dielectric substrate, wherein the second dielectric substrate is separated from the first radiation layer by a first distance; and a second radiation layer on the second dielectric substrate and comprising at least one second radiation portion; wherein an orthographic projection of each second radiation portion on the first dielectric substrate at least partially overlaps with an orthographic projection of a corresponding first radiation portion on the first dielectric substrate; and orthographic projections of the at least one first radiation portion, the at least one feed structure and the at least one second radiation portion on the first dielectric substrate all at least partially overlap with an orthographic projection of the first reference electrode layer on the first dielectric substrate;

wherein the at least one feed structure comprises a first feed structure and a second feed structure;

wherein the first feed structure and the second feed structure each comprise one first feed port and at least one second feed port;

one second feed port of the first feed structure is connected to one of the at least one first radiation portion at a first node; one second feed port of the second feed structure is connected to the first radiation portion at a second node; and for the first radiation portion, there is an angle between an extending direction of a connecting line between the first node on the first radiation portion and a center of the first radiation portion and an extending direction of a connecting line between the second node on the first radiation portion and the center of the first radiation portion;

wherein the antenna comprises a plurality of sub-arrays, each of which comprises one or more first radiation portions and one or more second radiation portions, and the one or more first radiation portions in each sub-array are fed by one first feed structure and one second feed structure, and the first radiation portions in different sub-arrays are fed by different first feed structures and different second feed structures;

wherein the first dielectric substrate comprises a first bottom plate, a first side plate and a second side plate, the first bottom plate comprises a first side surface and a second side surface extending in a first direction and opposite to each other in a second direction, the first side plate is connected to the first side surface, and the second side plate is connected to the second side surface; planes where the first side plate and the second side plate are located intersect with a plane where the first bottom plate is located;

the first reference electrode layer matches with the first dielectric substrate, and comprises a first reference sub-electrode opposite to the first bottom plate, a second reference sub-electrode opposite to the first side plate, and a third reference sub-electrode opposite to the second side plate;

a third dielectric substrate is on a side of the second reference sub-electrode away from the first side plate, and a fourth dielectric substrate is on a side of the third reference sub-electrode away from the second side plate; and at least one first transmission line is on a side of the third dielectric substrate away from the second reference sub-electrode, and at least one second transmission line is on a side of the fourth dielectric substrate away from the third reference sub-electrode;

one end of each first transmission line is electrically connected to the first feed port of the corresponding first feed structure through a first via extending through the first side plate, the second reference sub-electrode and the third dielectric substrate; and one end of each second transmission line is electrically connected to the first feed port of the corresponding second feed structure through a second via extending through the second side plate, the third reference sub-electrode and the fourth dielectric substrate.

16. An antenna, comprising a first substrate and a second substrate opposite to each other; wherein the first substrate comprises:

a first dielectric substrate;

a first radiation layer on the first dielectric substrate and comprising at least one first radiation portion and at least one feed structure; wherein each of the at least one first radiation portion is at least electrically connected to one of the at least one feed structure; and a first reference electrode layer on a side of the first dielectric substrate away from the first radiation layer; and the second substrate comprises:

a second dielectric substrate on a side of the first radiation layer away from the first dielectric substrate, wherein the second dielectric substrate is separated from the first radiation layer by a first distance; and a second radiation layer on the second dielectric substrate and comprising at least one second radiation portion; wherein an orthographic projection of each second radiation portion on the first dielectric substrate at least partially overlaps with an orthographic projection of a corresponding first radiation portion on the first dielectric substrate; and orthographic projections of the at least one first radiation portion, the at least one feed structure and the at least one second radiation portion on the first dielectric substrate all at least partially overlap with an orthographic projection of the first reference electrode layer on the first dielectric substrate;

wherein the at least one feed structure comprises a first feed structure and a second feed structure;

wherein the first feed structure and the second feed structure each comprise one first feed port and at least one second feed port;

one second feed port of the first feed structure is connected to one of the at least one first radiation portion at a first node; one second feed port of the second feed structure is connected to the first radiation portion at a second node; and for the first radiation portion, there is an angle between an extending direction of a connecting line between the first node on the first radiation portion and a center of the first radiation portion and an extending direction of a connecting line between the second node on the first radiation portion and the center of the first radiation portion;

wherein the antenna comprises a plurality of sub-arrays, each of which comprises one or more first radiation portions and one or more second radiation portions, and the one or more first radiation portions in each sub-array are fed by one first feed structure and one second feed structure, and the first radiation portions in different sub-arrays are fed by different first feed structures and different second feed structures;

wherein each feed structure comprises a plurality of branch lines from the first feed port to the at least one second feed port; at least a part of the plurality of branch lines have different line lengths; and an impedance difference between any two branch lines of each sub-array is in a range from 0.9Ω to 1.1Ω;

wherein the first dielectric substrate comprises a first bottom plate, a first side plate and a second side plate, the first bottom plate comprises a first side surface and a second side surface extending in a first direction and opposite to each other in a second direction, the first side plate is connected to the first side surface, and the second side plate is connected to the second side surface; planes where the first side plate and the second side plate are located intersect with a plane where the first bottom plate is located;

the first reference electrode layer matches with the first dielectric substrate, and comprises a first reference sub-electrode opposite to the first bottom plate, a second reference sub-electrode opposite to the first side plate, and a third reference sub-electrode opposite to the second side plate;

a third dielectric substrate is on a side of the second reference sub-electrode away from the first side plate, and a fourth dielectric substrate is on a side of the third reference sub-electrode away from the second side plate; and at least one first transmission line is on a side of the third dielectric substrate away from the second reference sub-electrode, and at least one second transmission line is on a side of the fourth dielectric substrate away from the third reference sub-electrode;

one end of each first transmission line is electrically connected to the first feed port of the corresponding first feed structure through a first via extending through the first side plate, the second reference sub-electrode and the third dielectric substrate; and one end of each second transmission line is electrically connected to the first feed port of the corresponding second feed structure through a second via extending through the second side plate, the third reference sub-electrode and the fourth dielectric substrate.

17. The antenna of claim 4, wherein the first dielectric substrate comprises a first bottom plate, a first side plate and a second side plate, the first bottom plate comprises a first side surface and a second side surface extending in a first direction and opposite to each other in a second direction, the first side plate is connected to the first side surface, and the second side plate is connected to the second side surface; planes where the first side plate and the second side plate are located intersect with a plane where the first bottom plate is located;

the first reference electrode layer matches with the first dielectric substrate, and comprises a first reference sub-electrode opposite to the first bottom plate, a second reference sub-electrode opposite to the first side plate, and a third reference sub-electrode opposite to the second side plate;

a third dielectric substrate is on a side of the second reference sub-electrode away from the first side plate, and a fourth dielectric substrate is on a side of the third reference sub-electrode away from the second side plate; and at least one first transmission line is on a side of the third dielectric substrate away from the second reference sub-electrode, and at least one second transmission line is on a side of the fourth dielectric substrate away from the third reference sub-electrode;

one end of each first transmission line is electrically connected to the first feed port of the corresponding first feed structure through a first via extending through the first side plate, the second reference sub-electrode and the third dielectric substrate; and one end of each second transmission line is electrically connected to the first feed port of the corresponding second feed structure through a second via extending through the second side plate, the third reference sub-electrode and the fourth dielectric substrate.

18. The antenna of claim 5, wherein the first dielectric substrate comprises a first bottom plate, a first side plate and a second side plate, the first bottom plate comprises a first side surface and a second side surface extending in a first direction and opposite to each other in a second direction, the first side plate is connected to the first side surface, and the second side plate is connected to the second side surface; planes where the first side plate and the second side plate are located intersect with a plane where the first bottom plate is located;

the first reference electrode layer matches with the first dielectric substrate, and comprises a first reference sub-electrode opposite to the first bottom plate, a second reference sub-electrode opposite to the first side plate, and a third reference sub-electrode opposite to the second side plate;

a third dielectric substrate is on a side of the second reference sub-electrode away from the first side plate, and a fourth dielectric substrate is on a side of the third reference sub-electrode away from the second side plate; and at least one first transmission line is on a side of the third dielectric substrate away from the second reference sub-electrode, and at least one second transmission line is on a side of the fourth dielectric substrate away from the third reference sub-electrode;

one end of each first transmission line is electrically connected to the first feed port of the corresponding first feed structure through a first via extending through the first side plate, the second reference sub-electrode and the third dielectric substrate; and one end of each second transmission line is electrically connected to the first feed port of the corresponding second feed structure through a second via extending through the second side plate, the third reference sub-electrode and the fourth dielectric substrate.

* * * * *